United States Patent [19]

Demenus

[11] 4,404,611

[45] Sep. 13, 1983

[54] BIDIRECTIONAL CASSETTE TRANSPORT

[75] Inventor: Richard Demenus, New York, N.Y.

[73] Assignee: Acoustiquide Corporation, New York, N.Y.

[21] Appl. No.: 282,664

[22] Filed: Jul. 13, 1981

[51] Int. Cl.³ .................... G11B 5/00; G11B 15/00; G11B 15/10

[52] U.S. Cl. .................................. 360/137; 360/71; 360/74.1

[58] Field of Search ............... 360/137, 71, 74.1, 105, 360/61, 62, 96.3

[56] References Cited

U.S. PATENT DOCUMENTS

| | | | |
|---|---|---|---|
| 4,227,222 | 10/1980 | Sato et al. | 360/137 X |
| 4,336,560 | 6/1982 | Matsumoto | 360/137 |
| 4,360,846 | 11/1982 | Asai et al. | 360/137 |
| 4,370,686 | 1/1983 | Katoh et al. | 360/96.3 |

*Primary Examiner*—Robert L. Richardson

*Attorney, Agent, or Firm*—Mark T. Basseches; Paula T. Basseches

[57] ABSTRACT

The present invention is directed to an improved bidirectional cassette transport wherein the various operating modes can be achieved through the use of a single lever. The device is characterized in the provision of a novel coupling arrangement between the control lever and the cassette drive whereby the cassette is virtually jam-proof, is protected against damage, and a constant tension in the tape is achieved. The device is particularly suited for use as a leasable player cassette of the type frequently employed in museums for supplying explanatory background and like information in conjunction with the exhibits. The suitability of the device for such use derives from the ease with which the same may be operated, the foolproofness of its operation and the facile manner in which portions of the auditory materials may be repeated.

12 Claims, 15 Drawing Figures

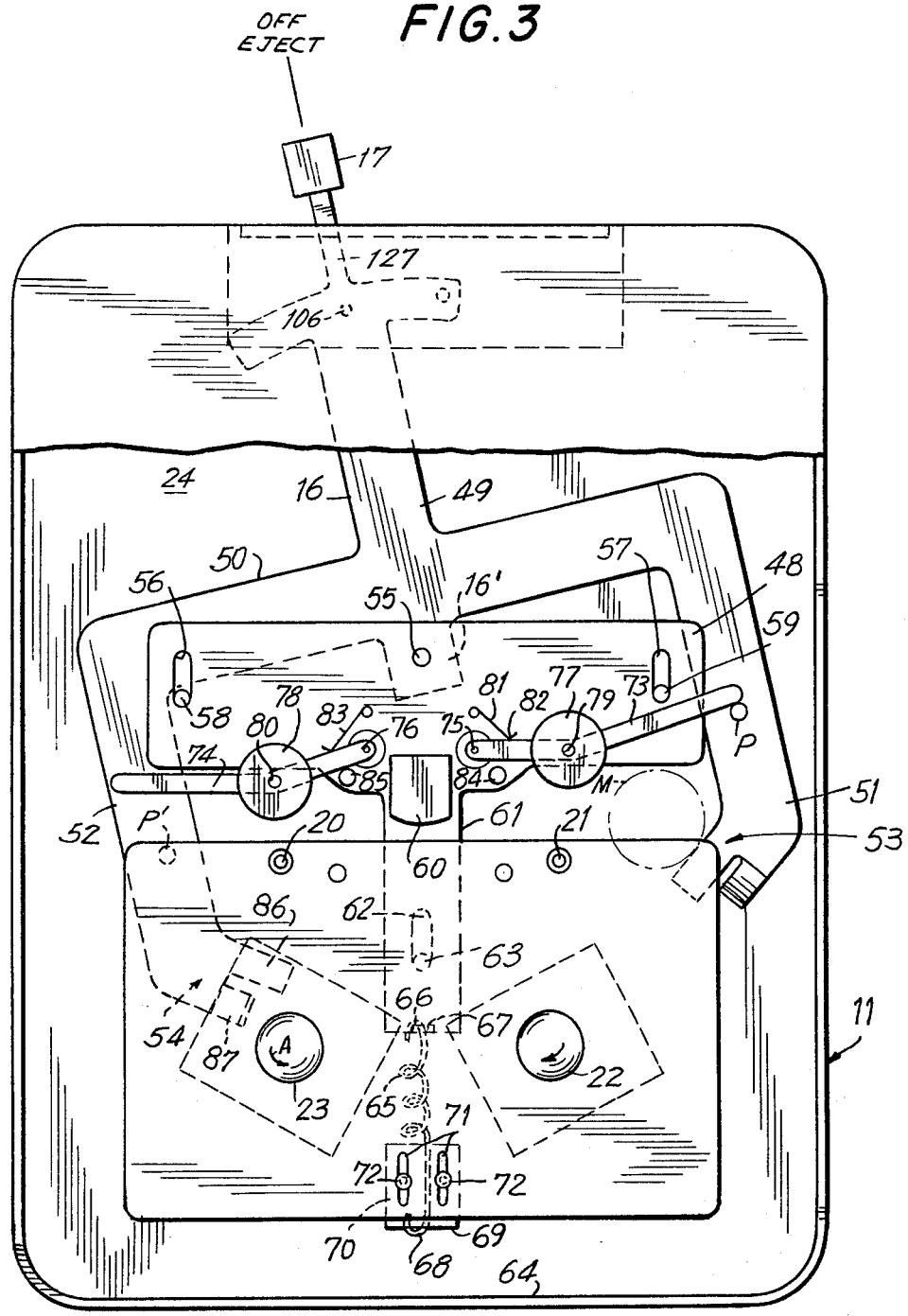

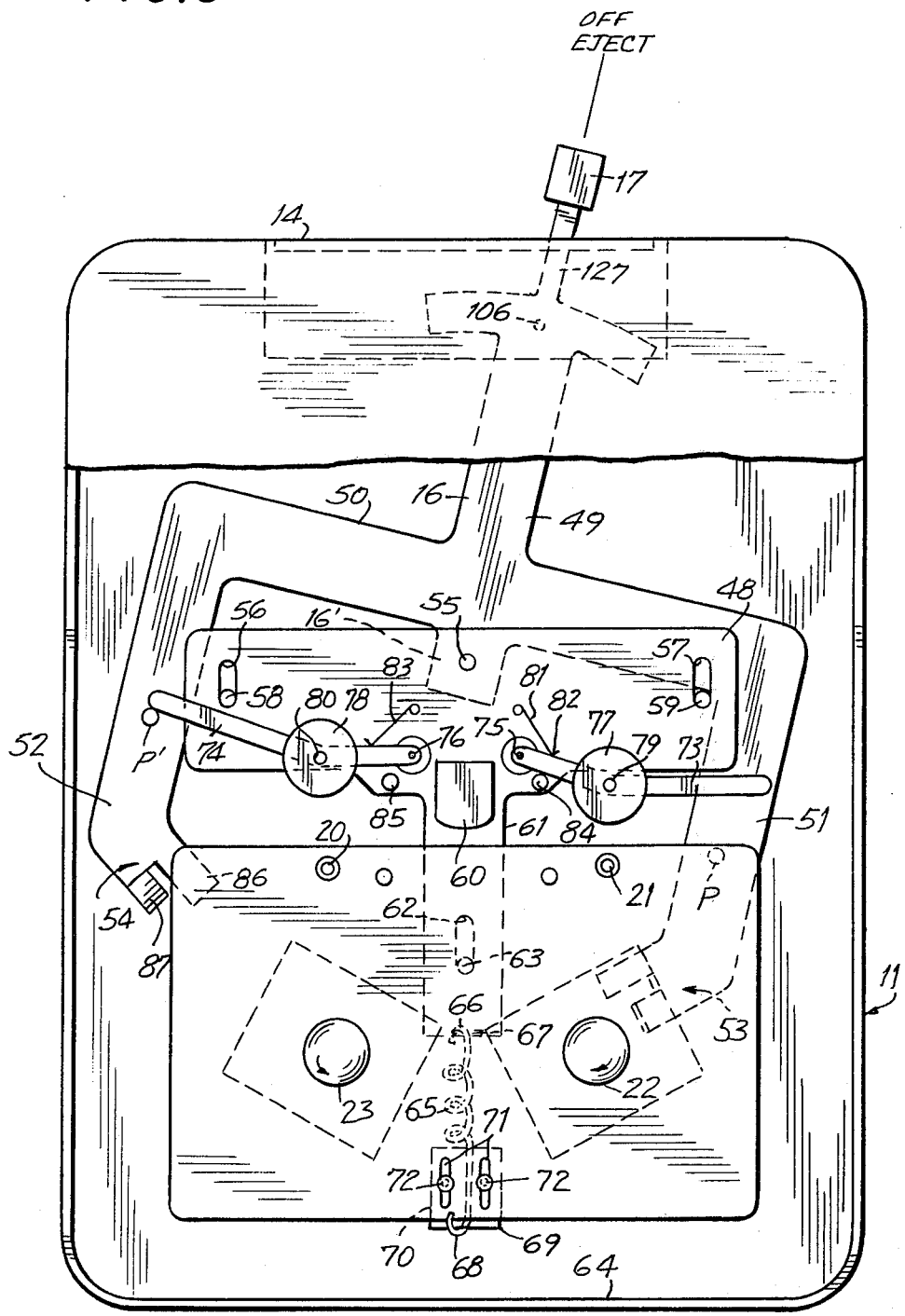

FIG.14
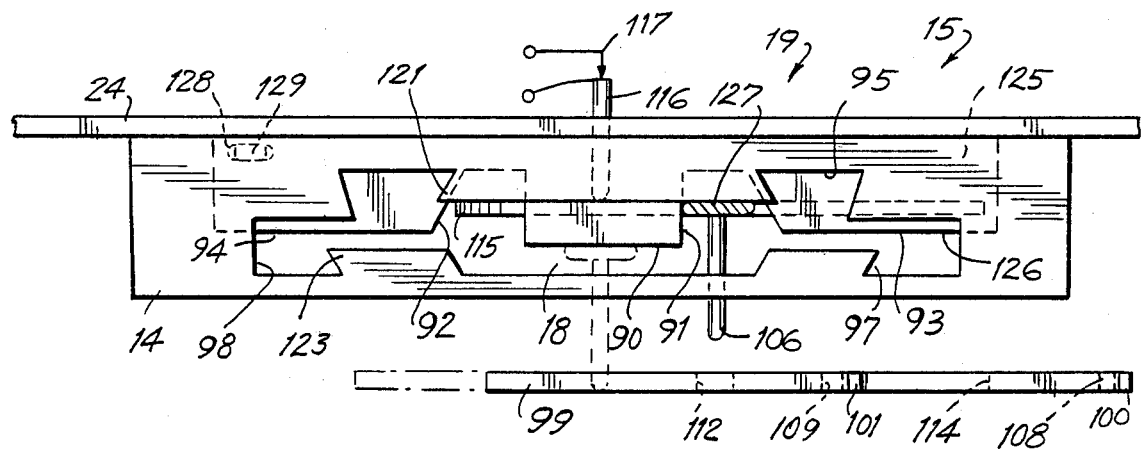
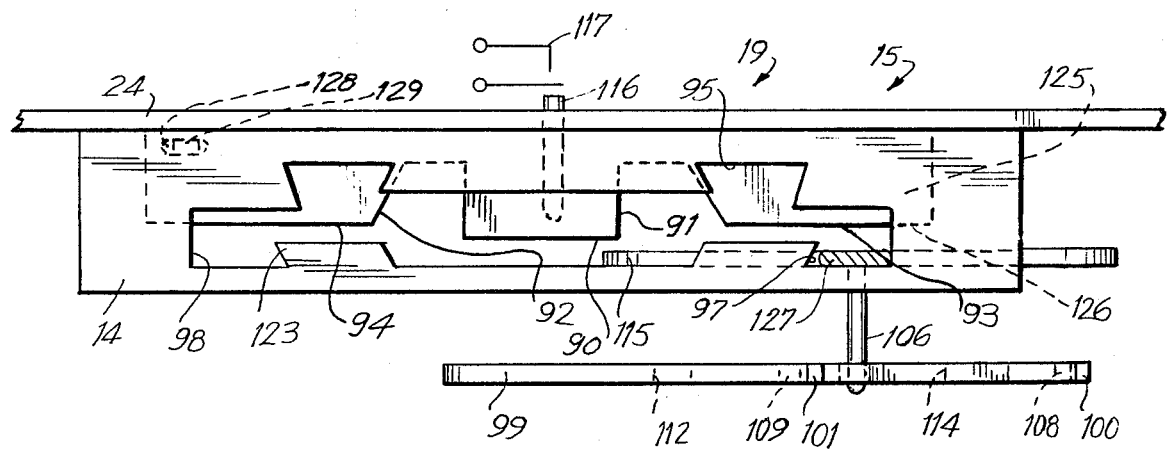
FIG.15

BIDIRECTIONAL CASSETTE TRANSPORT

BACKGROUND OF THE INVENTION

1. Field of the Invention

The present invention is in the field of bidirectional cassette transport devices and relates more particularly to a cassette tape transport wherein the various transport functions may be achieved through the use of a single lever.

2. The Prior Art

Bidirectional tape transport mechanism are known per se and a wide variety of such devices are available. Known transports of the type described suffer from drawbacks which, in large measure, have inhibited their widespread use. Such drawbacks include complexity of construction, with consequent high failure rate and high initial exposure, the provision of complicated control apparatuses and problematical coupling of the drive mechanism to the cassette proper with resultant frequent jamming spilling and, in some instances, rupture of the tape.

In order more clearly to appreciate the advantages of the present invention, it is to be noted that an important use for bidirectional tape transport devices is in the field of providing information at museums, art galleries, historical sites and the like. In such environments it is usual to provide as a service to visitors, a tape cassette player containing prerecorded tape encoded with information pertaining to various aspects of the exhibit, site, etc. As the visitor observes an element or elements of the exhibit, the tape portions pertinent thereto may be played back, providing a simultaneous visual inspection and audible explanation.

Since each user will wish to review an exhibit at his own pace and at a sequence selected by him, it is highly desirable that the cassette player system be subject to ready adjustment to play back the specific portions of the tape pertinent to the element of the exhibit being viewed.

It will thus be seen that the visitor is presented with a player mechanism with which he is totally unfamiliar, which mechanism must be frequently operated through various modes to suit the user's particular needs. In view of the unfamiliarity of the user with the tape mechanism, it is likely that he may rapidly shift the controls between the various modes. Further, since the user does not own the tape player device, he is less likely to treat the unit with care than if it were his property.

While tape transport mechanisms heretofore known in many instances include so-called logic mechanism, such as time delays, solenoids, etc., which preclude damage to the tape if the user should, for instance, rapidly shift a forwardly moving tape into the reverse mode, such logic components greatly add to the cost and weight of the device. Since portability is an important factor, mandating the use of a battery operated transport, the employment of electrically driven logic components, in addition to increasing the weight and cumbersomeness of the unit, drain the batteries.

As examples of prior art devices embodying one or more of the disadvantages hereinabove referred to, reference is made to the following U.S. Pat. Nos.:

3,217,994 Smith
3,377,438 Schroter
3,767,137 Richt
3,810,237 Nozawa
3,810,240 Nozawa
3,810,241 Murata
3,930,268 Uemura
4,118,745 Matsuura
4,159,492 Ban
4,209,812 Umezawa

SUMMARY

The present invention may be summarized as an improved bidirectional cassette transport having a novel drive and control mechanism including a minimum of moving parts and providing for simple, reliable and accurate feed of the tape.

The invention further pertains to a tape transport of the type described wherein all of the various tape functions, illustratively fast forward, fast reverse, back space (in either direction), forward and reverse play and stop and eject, may be achieved through manipulation of a single control lever member.

The invention is further directed to a novel bidirectional tape drive mechanism of the type described wherein the tape is continuously subjected to an active drag or tension in a direction opposite to the direction of drive whereby the likelihood of spilling, tangling or jamming due to the formation of slack is virtually eliminated.

The invention relates still further to a device of the type described wherein the tape reels within the cassette are coupled to turntables which are continuously urged to rotate in opposite directions and the tape take-up and supply are effected by coupling one or the other of the reels selectively to drive mechanism in a manner which increases the torsional coupling forces of the one reel over those coupling the other, whereby a continuous back tension is effected.

The invention further relates to a tape transport mechanism of the type described wherein the reels of the cassette are coupled to the turntables, which are in turn coupled to drive mechanism through friction clutch members. The turntables are frictionally urged to rotate in opposite directions, the device including an operating lever which, when canted or rocked, increases the frictional coupling forces between the drive mechanism and one said turntable, whereby movement of the turntable and, hence, the cassette reel coupled thereto, is caused in the fast forward or fast reverse modes to move in a direction dictated by the increased frictional forces between a particular turntable and drive mechanism.

In the play modes the driving force is, as usual, provided by engagement of one of two capstans with one of two pinch rollers, the active frictional tensioning forces also being exerted on the tape during such modes.

Accordingly it is an object of the invention to provide an inexpensive, simple, easily operated bidirectional cassette transport, the functions or modes of which may be controlled by actuation of a single lever.

A further object of the invention is the provision of a transport of the type described wherein frictional drive means are interposed between the drive mechanism of the transport and the turntables coupled to the cassette, the turntables being constantly driven in opposite directions with a first torsion transmitting force, operation of the lever functioning to increase the torsion transmitting force between one said turntable and an element of the drive means whereby the movement imparted to the tape by the capstans is accompanied by a cooperative action of the tape supply and take-up mechanism which results in the take-up reel being more tightly coupled to the drive mechanism than the supply reel, which latter reel at all times exerts an active drag force on the tape.

A further object of the invention is the provision of a transport of the type described wherein back spacing is achieved in a simple and effective manner.

To attain these objects and such further objects as may appear herein or be hereinafter pointed out, reference is made to the accompanying drawings, forming a part hereof, in which:

FIGS. 3 to 8 are semi-diagrammatic views of the transport mechanism showing the components thereof in the various operating modes, namely:

Figure 9:
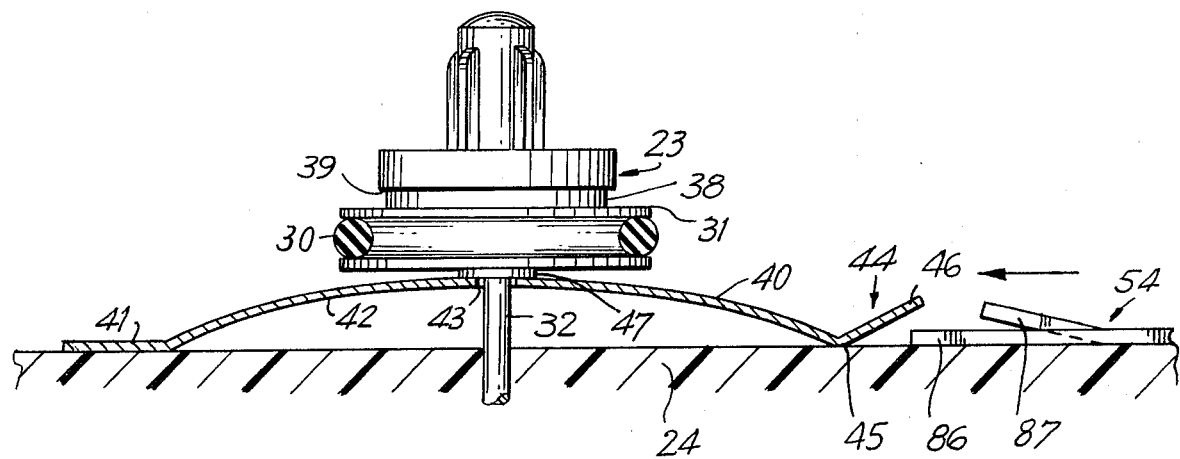
Figure 4:
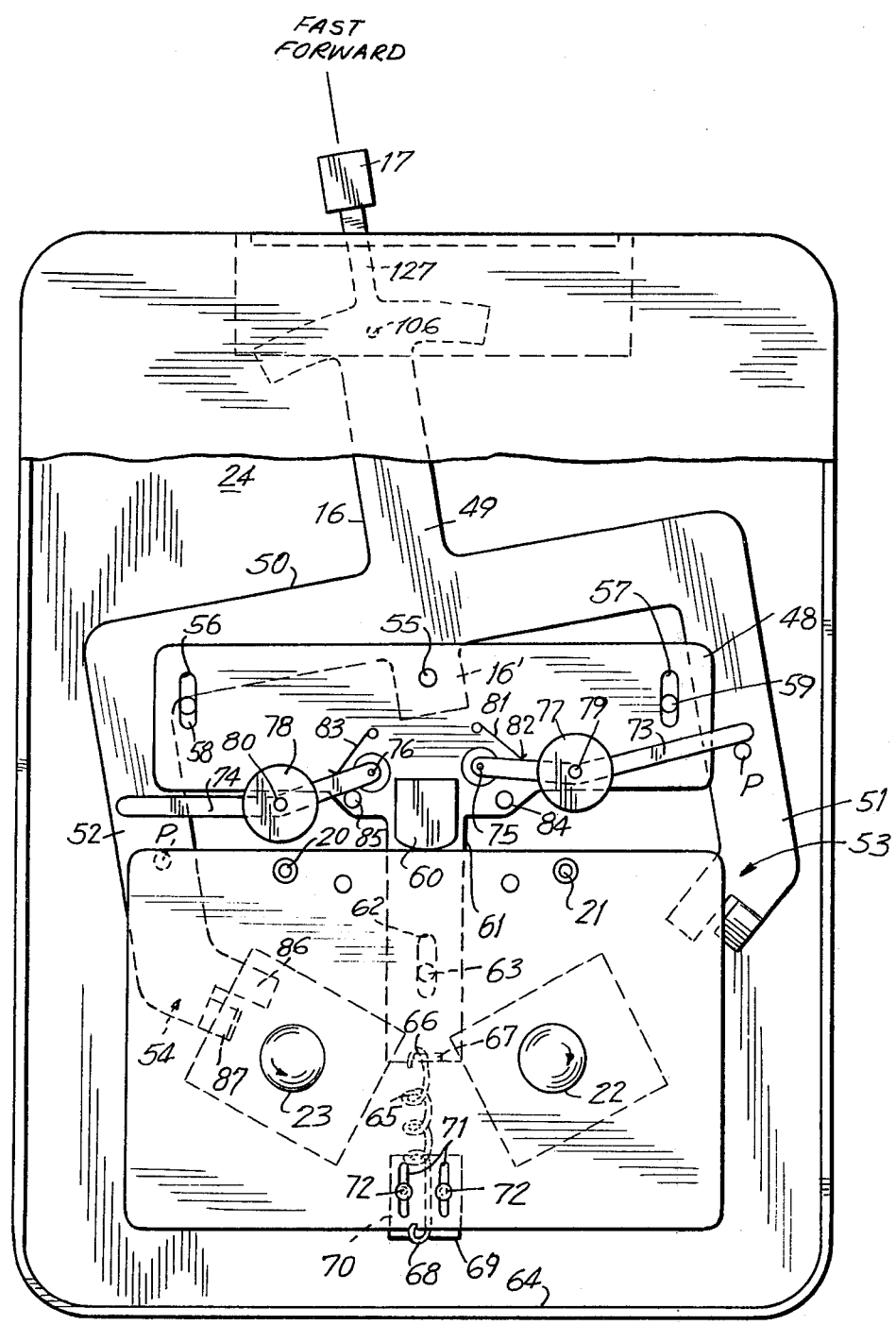
Figure 5:
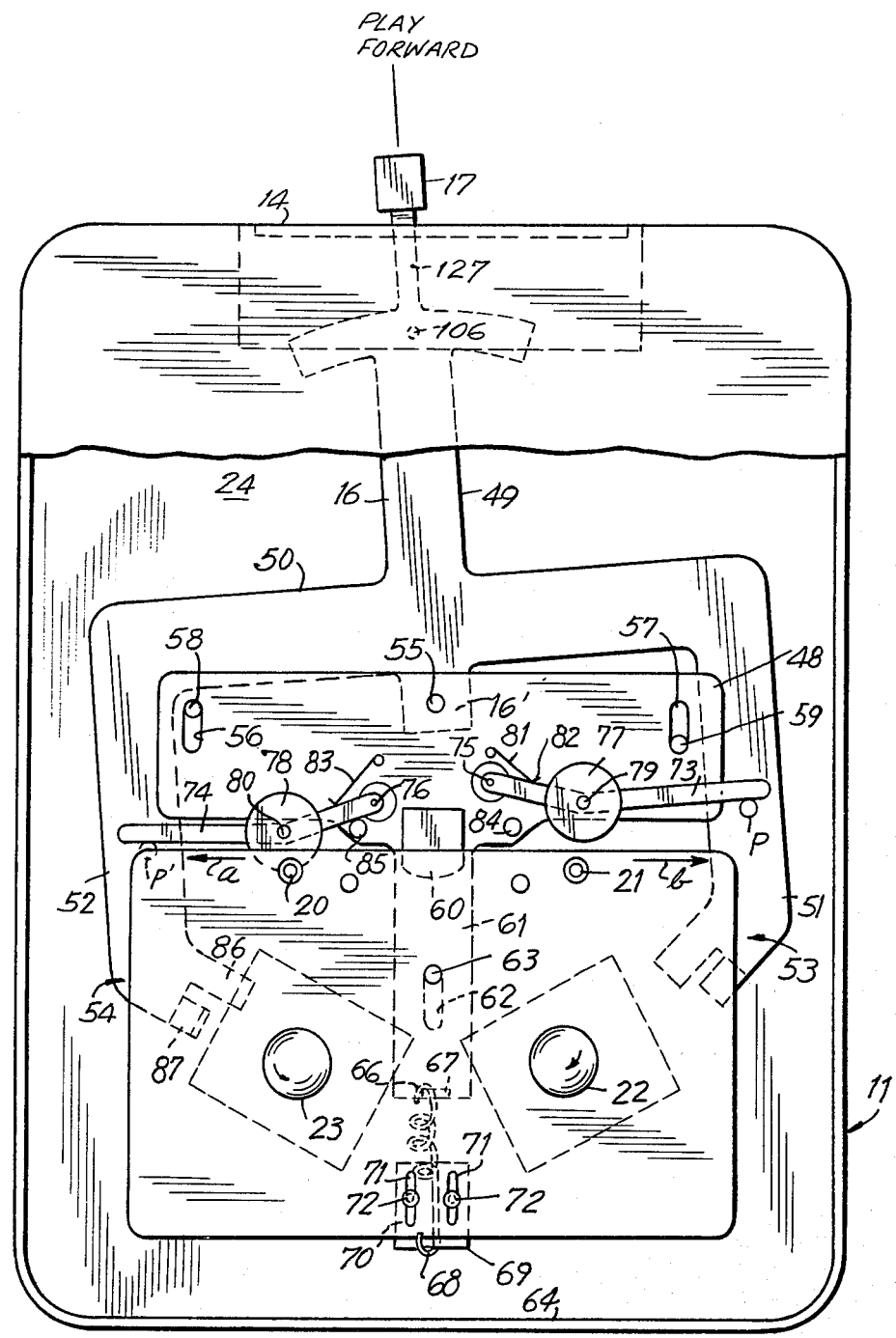
Figure 6:
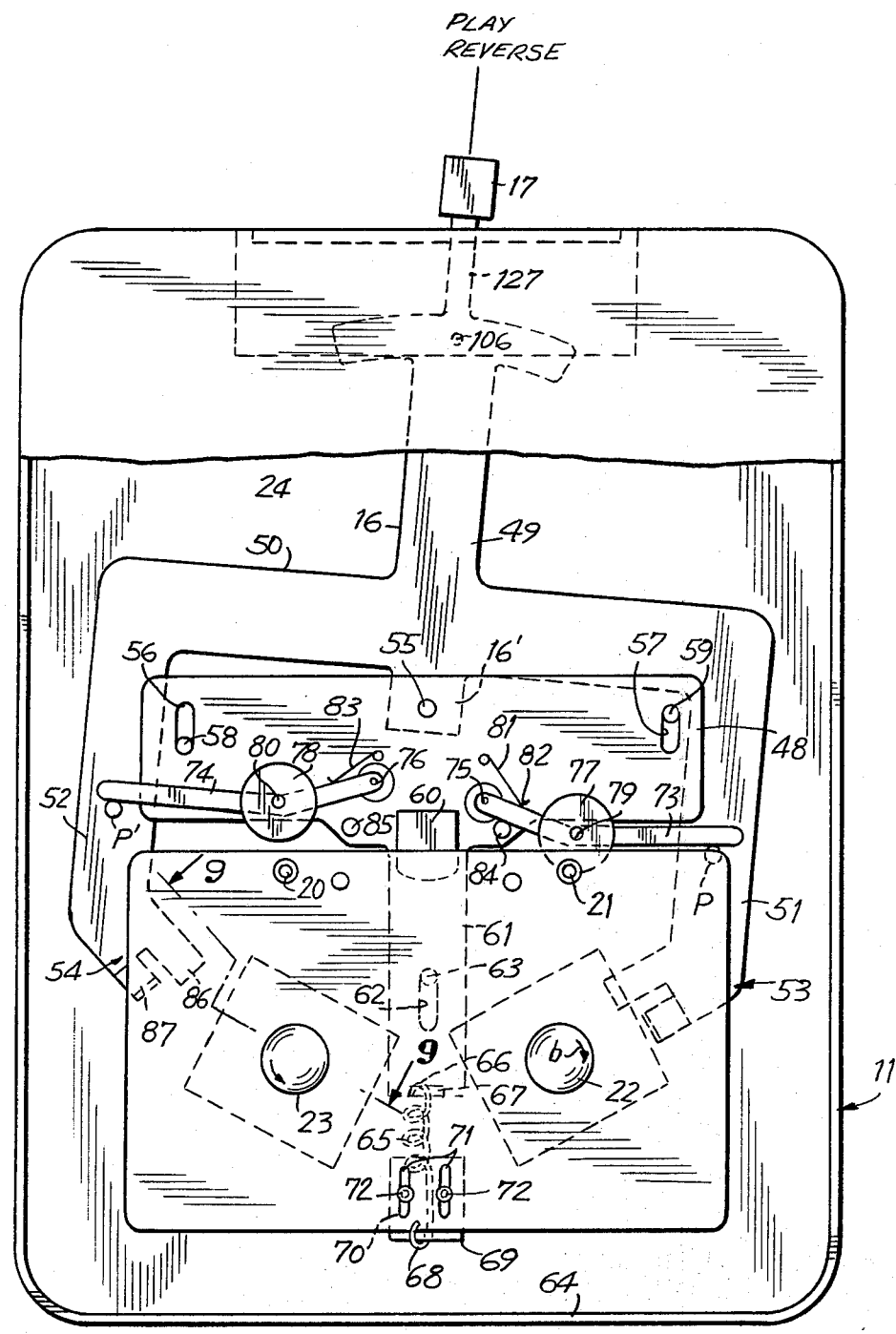
Figure 7:
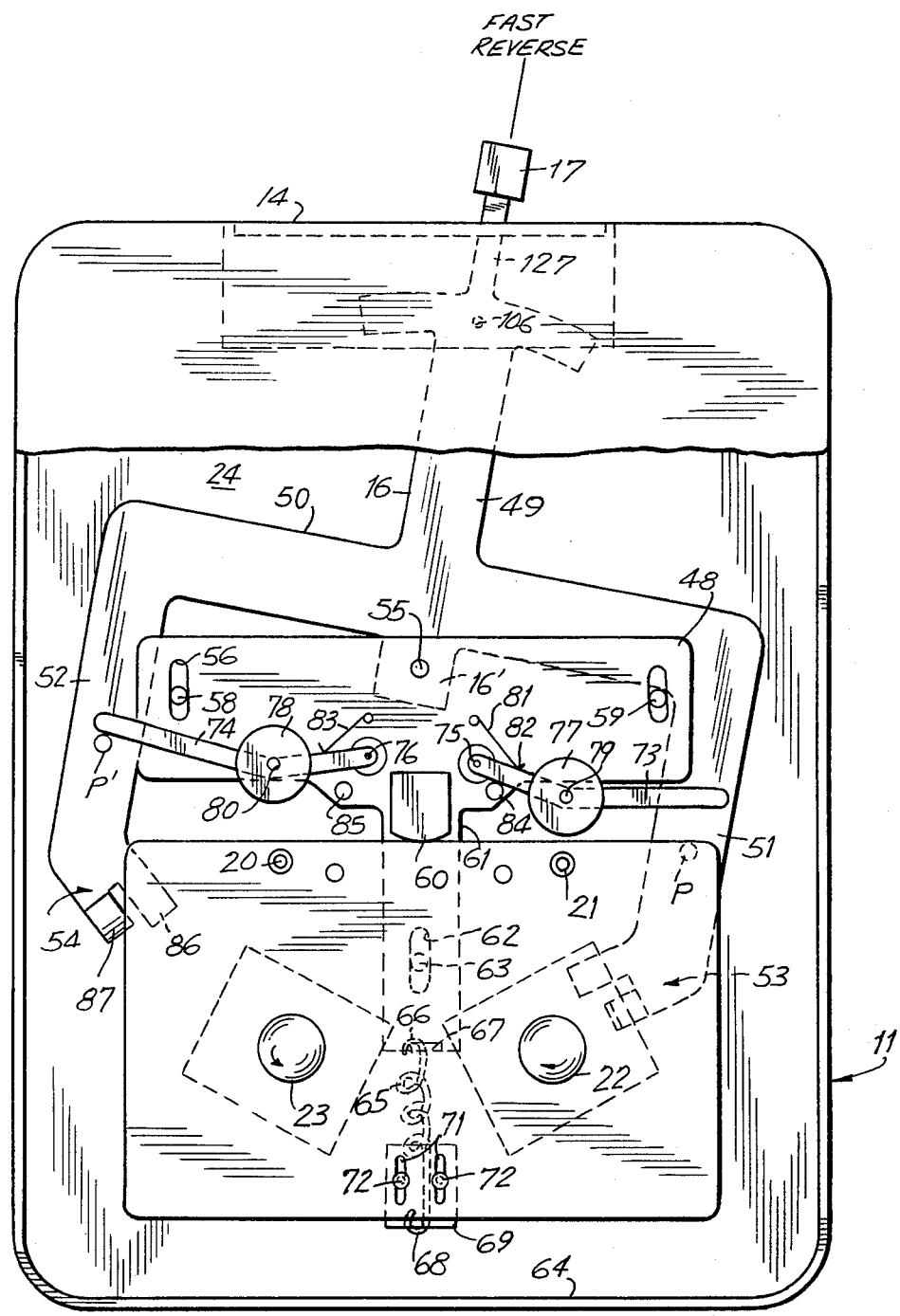
Figure 10:
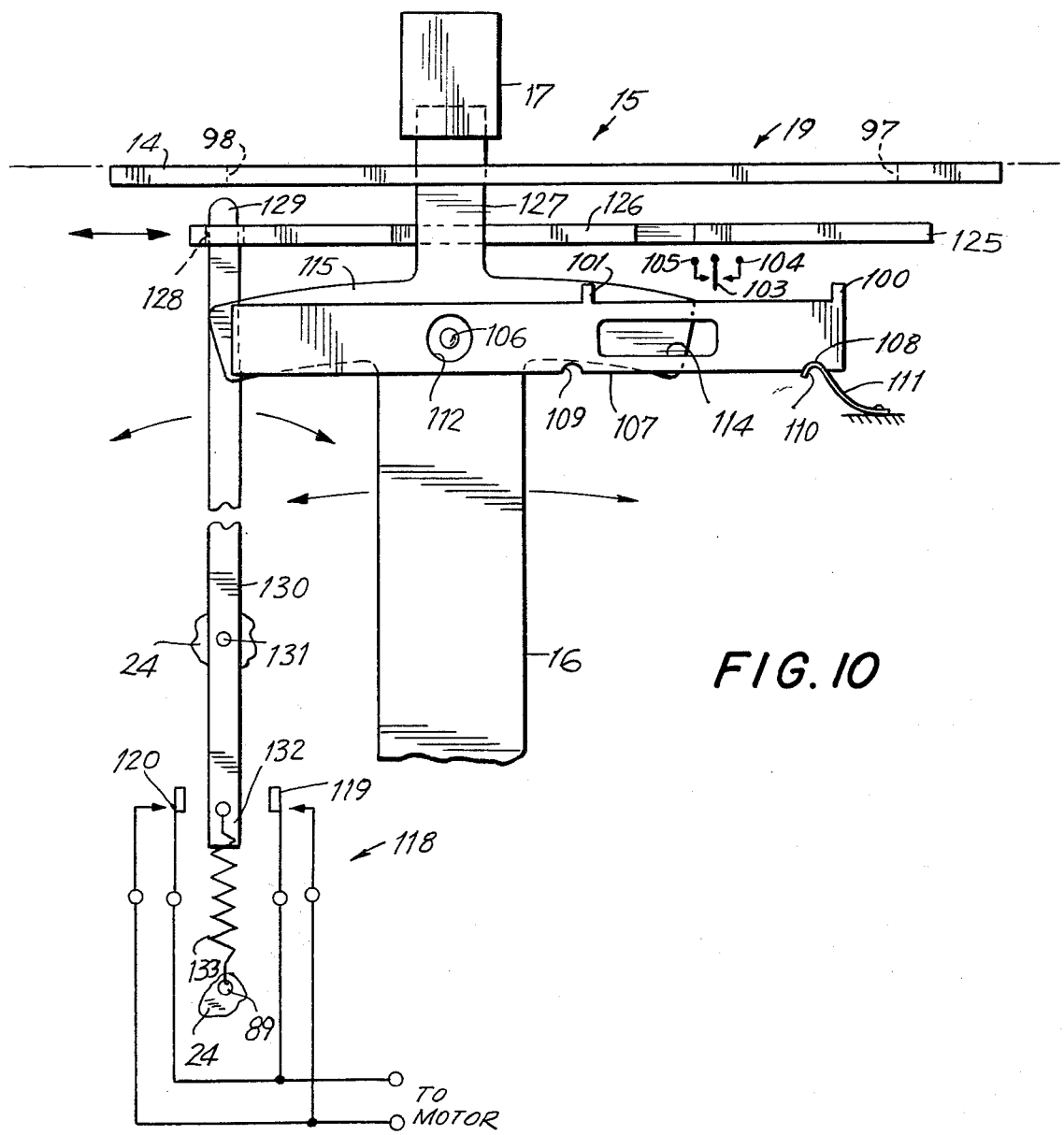
Figure 11:
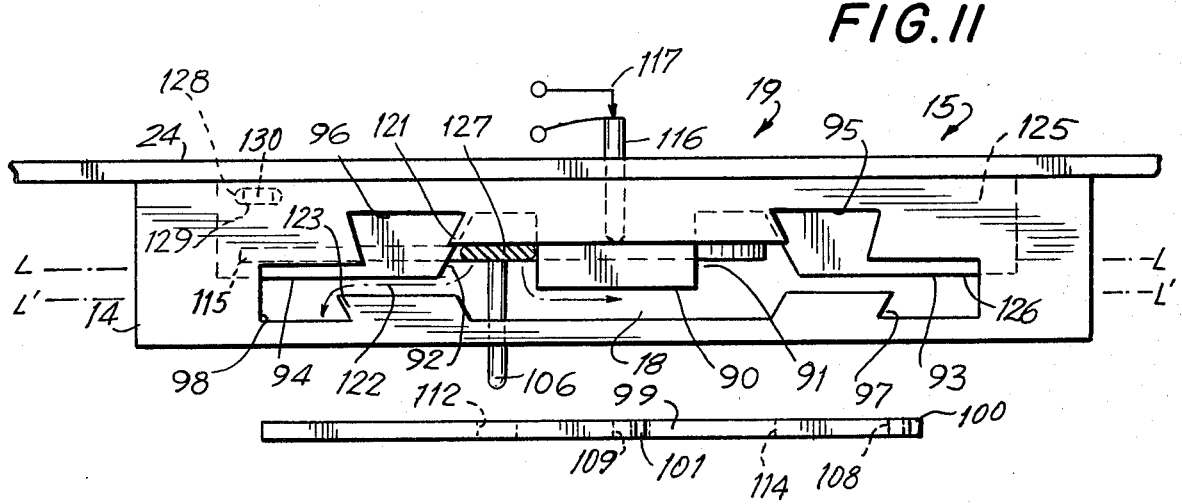
Figure 12:
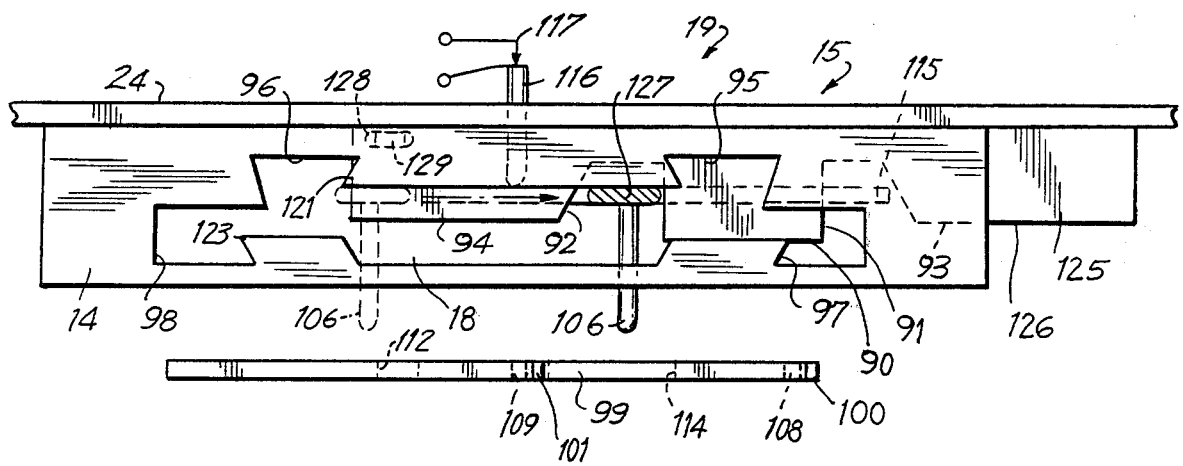
Figure 13:
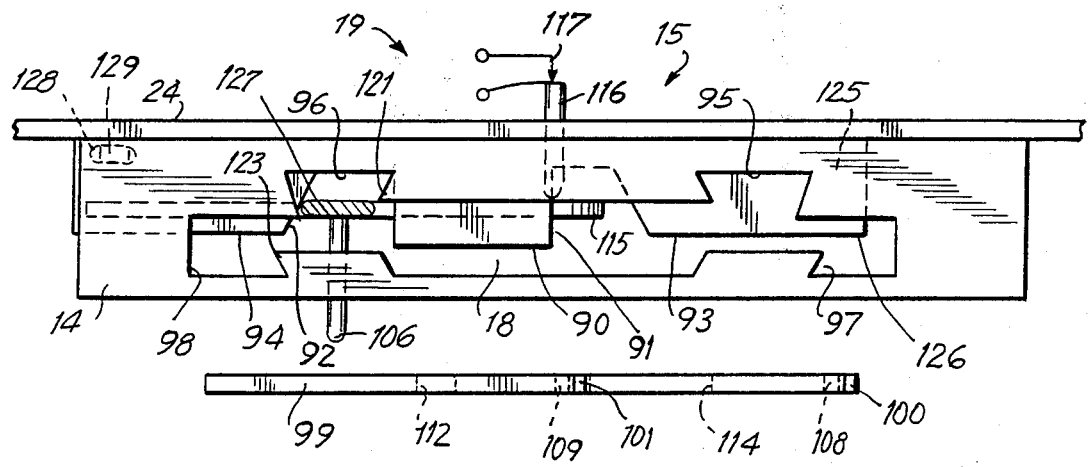

off/eject: FIG. 3;
fast forward: FIG. 4;
play forward: FIG. 5;
play reverse: FIG. 6;
fast reverse: FIG. 7;
off/eject: FIG. 8;

FIG. 9 is a magnified sectional view of the turntable drive assembly taken on the line 9—9 of FIG. 6;

FIG. 10 is a fragmentary sectional view of the gate and control components of the assembly;

FIG. 11 is a top plan view of the gate assembly depicting the parts in the forward play mode;

FIG. 12 is a view similar to FIG. 11 showing the position of the parts in a review or temporary fast reverse mode;

FIG. 13 is a view similar to FIG. 11 showing the position of the parts in the fast forward mode;

FIG. 14 is a view similar to FIG. 11 showing the position of the parts in the reverse play mode, depicting the path of movement of the control lever in the course of shifting from forward play to reverse play;

FIG. 15 is a view similar to FIG. 11 showing the position of the parts in an off/eject position.

Figure 1:
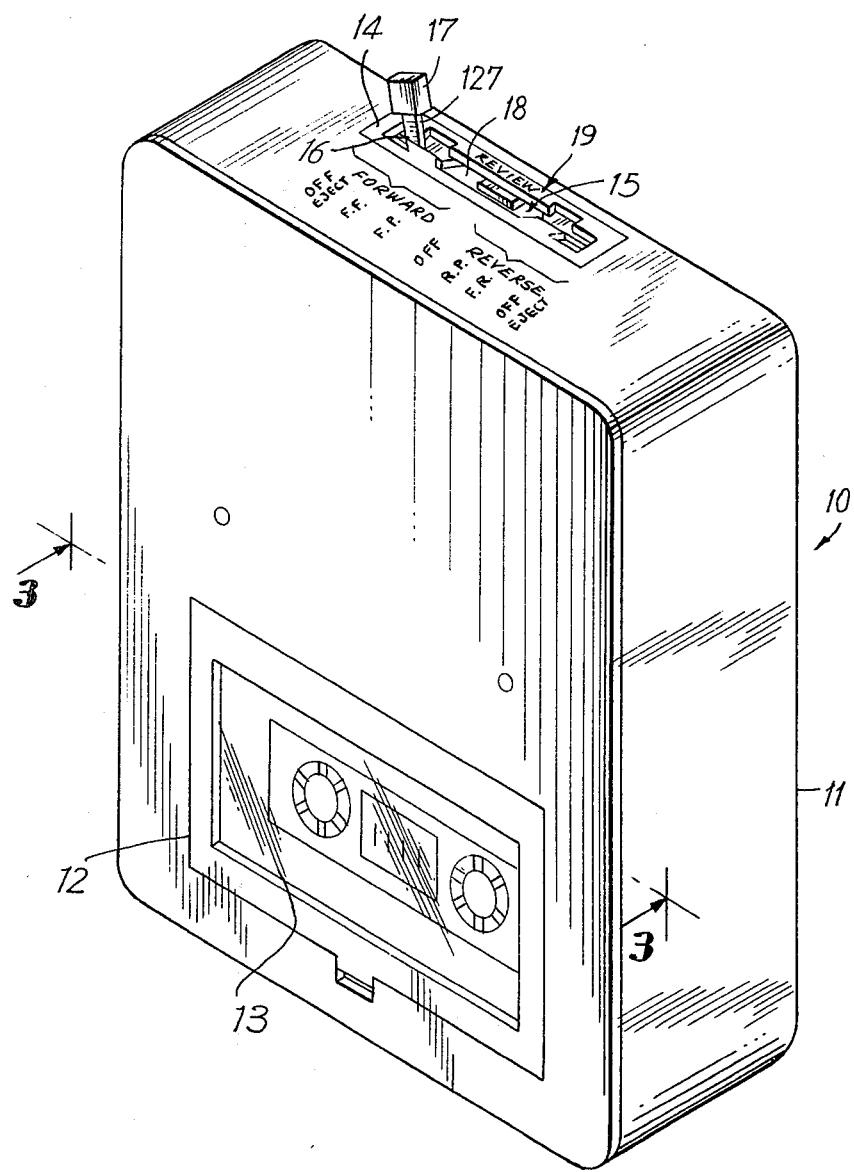
FIG. 1 is a perspective view of a tape mechanism in accordance with the invention.

Turning now to the drawings, there is disclosed in FIG. 1 a battery operated bidirectional cassette player device 10. The device includes a case 11 of metal or plastic. Load access 12 is covered by a hinged window 13 for insertion and removal of a conventional magnetic tape cassette.

The player includes at an upper wall portion 14 a control assembly 15. An operating arm 16 having an actuator knob 17 projects outwardly through clearance slot 18 in the gate assembly 19 forming part of the control apparatus.

The positions of operation (seven plus a center off position being shown in the illustrated embodiment) may be suitably labeled, e.g. off/eject, fast forward, forward play, off, review, reverse play, fast reverse, off/eject.

Figure 2:
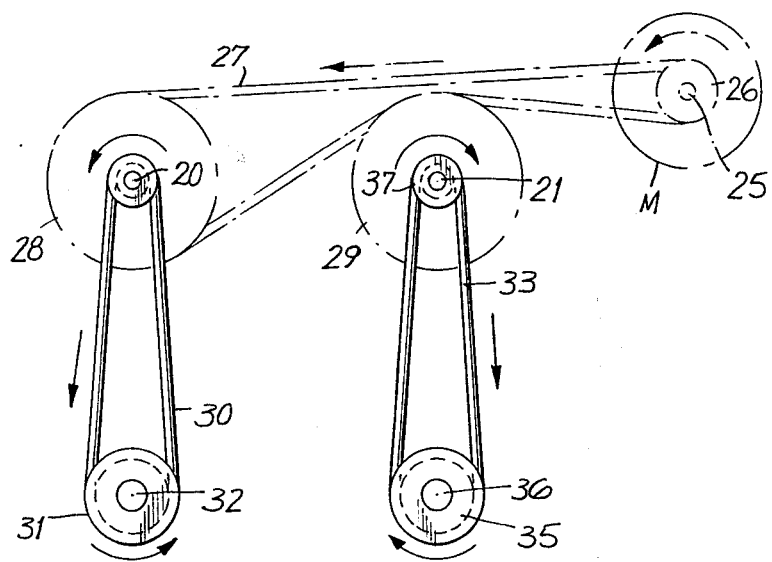
FIG. 2 is a diagrammatic view of portions of the drive mechanism thereof.

The device is powered by a two speed motor M, FIGS. 2 and 3. The various figures have been simplified and shown in semi-schematic form to illustrate only those portions necessary to an understanding of the present invention.

The motor M is drivingly connected reversely to rotate a pair of tape drive capstans 20, 21 and a pair of tape feed turntables 22, 23. The motor, capstans and turntables are mounted to base plate 24.

Details of the tape drive assembly are shown in FIG. 2.

More particularly, the motor M includes a drive shaft 25 carrying drive pulley 26. A main drive belt 27 is reeved over pulley 26, the belt being disposed in driving connection with capstan drive pulleys 28, 29 which, in addition, function as flywheels.

As best seen in FIG. 2, the belt 27 engages about drive pulley 28 and then passes over the upper surface of drive pulley 29 whereby the pulleys 28, 29 are driven in opposite directions.

Motor M is of the type which is electrically operable at a slow or tape play speed and a fast or tape wind speed.

A first turntable drive belt 30 links turntable pulley 31 rotatable on shaft 32 fixed to the base plate 24 with turntable drive pulley 33 fixed to capstan shaft 20. Similarly, second turntable drive belt 34 links turntable drive pulley 35 rotatable on shaft 36 fixed to the base plate 24 with capstan drive pulley 37 fixed to capstan shaft 21. The pulleys 31 and 35 are keyed to rotate with the shafts 32, 36, respectively, and are free to move axially of the respective shafts.

The turntable drive pulleys 31 and 35 are linked to the turntable members 22, 23 by an identical pair of friction clutch assemblies, one such assembly being illustrated in detail in FIG. 9. The clutch assemblies include a washer member 38, illustratively of felt, interposed between the upper surface of pulley, e.g. 31, and the undersurface 39 of the turntable 22. A leaf spring member 40, mounted as at 41 on the base plate 24, includes a bowed central portion 42, apertured as at 43, shaft 32 passing through the noted aperture. The free end 44 of the leaf spring includes a depending foot portion 45 which bears against the base plate and an upwardly inclined cam portion 46.

The spring 40 is constructed and arranged to apply in its normal position shown in FIG. 9 a light upward pressure against antifriction bearing disk 47. Turntable member 23, which rotates on the shaft 32, is fixed against upward movement thereon.

It will be observed that the upward pressure of spring 40 against pulley 31 functions lightly to compress the felt washer 38 against the undersurface 39 of turntable 23. It will thus be seen that the rotary motion imparted to the pulley 31 will be communicated to the turntable 23 through the frictional coupling or torque transmitting influence of the washer 38. It will be further recognized that the assembly as described, which acts in the manner of a friction clutch, will permit slippage between the turntable 22 and the drive pulley 31 should a sufficient slowing force be exerted against the turntable.

Referring now to FIGS. 3 through 8, there is disclosed the operative elements of the transport assembly wherein, as noted, non-essential details have been eliminated for purposes of clarity of illustration.

The main components of the transport include a tape head carrier member 48 and a control lever 49. The control lever 49 is generally bifurcate in configuration, including an operating arm portion 16, a branch arm 50 centrally connected to the operating arm and perpendicular thereto, and a depending pair of actuator arms 51, 52 extending downwardly from the extremities of the branch arm.

The actuator arms 51, 52 include cam follower assemblies 53, 54 which will be described in detail hereinafter.

The control arm 16 includes a depending connector branch 16′ which is pivotally linked, as by pivot pin 55, to the carrier member 48. The carrier member 48, which is preferably generally in the configuration of a T, is mounted to the base plate 24 for linear movement relative thereto. To this end, the carrier member 48 includes a spaced pair of vertically directed slots 56, 57 through which pass with sliding clearance a concomitantly spaced pair of headed guide pins 58, 59, made fast to the base plate 24.

Fixedly mounted to the carrier member 48 is the tape playback head 60. A depending branch 61 of the carrier member 48 includes a further vertical slot 62 through which passes a further guide pin 63 extending from the base plate. The carrier member 48 is normally biased downwardly toward the bottom wall portion 64 of the case 11 by a coil spring 65. An upper end 66 of the coil spring is hooked through an aperture in upwardly projecting tab 67 forming part of depending branch 61 of the carrier member. The lower end 68 of the spring is secured to a bracket 69 defining a cassette hold-in lever. The bracket 69 is, in turn, secured to a vertically slidable shank portion 70 including vertical slots 71 through which pass guide pins 72.

A pair of pressure roller mounting levers 73, 74 are pivotally supported on the carrier member 48 for movement about pivot axes 75, 76. Each of the levers 73, 74 carries a pressure roller 77, 78, respectively, mounted on pivots 79, 80, respectively, secured to the pivot levers 73, 74, respectively. A leaf or coil spring member, illustratively 81, mounted on plate 48 includes a depending finger 82 biased against the upper surface of the lever 73, urging the lever in a downward direction.

In similar fashion spring 83 bears against lever 74, urging the lever and the pressure roll carried thereby in a downward direction. The carrier member includes a pair of stop posts 84, 85, positioned to engage against the undersurface of levers 73, 74, respectively, and limit the scope of their downward pivotal movement.

Referring again to FIG. 9, there will now be described the interplay between the leaf springs 40 of the clutch assemblies and the follower portions 53 or 54 of the control lever 49. Since the clutches associated with turntables 22 and 23 are identical, a description of one will suffice.

As seen in FIG. 9, the follower portion 54 includes a first lift finger 86 at a lead portion of the follower, and in trailing relation thereto a second follower finger 87. As will be best perceived from FIG. 9, when the lift finger 86 is advanced under the cam portion 46 of the leaf spring 40, the spring will be lifted and the pressure exerted against pulley 31, and consequently the coupling forces linking the pulley to the turntable 23 will be increased as opposed to the unlifted or quiescent condition of the spring.

It will further be observed that when the follower 54 is further advanced under the leaf spring 40, the second follower finger 87 will be lifted under the cam portion 46, still further compressing the spring and increasing the coupling forces between a respective pulley and turntable.

There will next be described details of the gate mechanism, FIGS. 10 to 15, embodied in the control assembly 15. It should be understood that the specific gate assembly described hereinafter is representative of a satisfactory mechanism for maintaining the operating arm 16 in the various mode positions and actuating the necessary switching mechanisms. Various other gating mechanisms may be suitably employed, as will be readily recognized by those skilled in the art.

The gating mechanism includes an actuator plate 125 slidably supported for movement in spaced parallel relation to the upper wall portion 14 of the cassette assembly. As hereinabove noted, said upper wall portion includes a clearance slot having various detent shoulders formed therein, as will be more specifically described hereinafter.

The actuator plate 125 is mounted on the base plate by means (not shown) which support the same for linear sliding movement in a plane parallel with the wall portion 14. The actuator plate 125 includes an indexing side edge 126, adjacent which is disposed reduced neck portion 127 of the operating arm 16.

The plate 125 includes a drive slot 128 through which extends the upper end 129 of drive lever 130 mounted for pivotal movement about pivot pin 131 made fast to the base plate 24, the pivot pin enabling the lever 130 to be rocked about an axis parallel to the base plate.

The lower end 132 of the actuator lever is connected to a stiff coil spring 133, the other end 89 of which is fixed to the base plate. It will thus be perceived that the tension spring 133 will normally maintain the lever 130 in a position substantially perpendicular to the actuator plate 125—see FIG. 10.

It will further be perceived that the plate 125 may be moved in a direction parallel to the top wall 14 against the restoring forces of the spring 133 which normally tend to return the plate 125 and, hence, the actuator arm 16 to the neutral position shown in FIG. 10.

As best seen from an inspection of FIGS. 11 to 15, the actuator edge 126 includes a central dwell surface 90, a forward detent notch 92 and a rearward detent notch 91. The surface 126 further includes forward lift portion 94 and reverse lift portion 93. The top wall portion 14 of the case includes a fast forward detent notch 96, fast reverse detent notch 95, a forward off/eject notch 98 and a reverse off/eject notch 97.

The control assembly includes a tape track control plate 99 which is supported for transverse linear movement by guide means (not shown for purposes of clarity) secured to the base plate 24.

The tape head control plate 99 includes an upwardly directed pair of track switch actuating fingers 100, 101, disposed in the path of the single pole-double throw tape track control switch 102. The control switch 102 includes a trip lever 103 in the path of movement of the fingers 100, 101. When the plate 99 is shifted to the right as viewed in FIG. 10, finger 101 will engage the trip lever 103, closing the circuit between the lever and contact 104, introducing the reverse tape head track into the circuit. Conversely, when the plate 99 is shifted to the left a distance sufficient to move trip finger 103 against contact 105, the forward track of the tape head is introduced into the circuit.

The operating arm 16 includes a laterally projecting track change pin 106. The pin 106, as seen for instance in FIGS. 11 to 13, is normally laterally displaced from the tape track control plate 99.

The control plate 11 includes on its undersurface 107 a depending pair of detent seats 108, 109. A detent member 110 is biased by spring 111 against the surface 107 and when entering one or the other of the seats 108, 109 serves to maintain the plate 99 against accidental lateral shifting movement. The plate 99 includes an actuator aperture 112.

The track change pin 106 is positioned to coact with actuator aperture 112 and shift the plate between its forward and reverse track connecting positions responsive to appropriate movements of the actuator arm 16. The actuator arm, which is of springy metal, may be deflected from its central position, as shown in FIGS. 11 to 14, either upwardly when viewed in the orientation of said figures, i.e. toward the plate 99 or downwardly from said central position into the notches 95, 96.

The plate 99 includes an axially extended clearance slot 114 for purposes which will appear hereinafter.

The operator arm 16 includes a power switch actuator plate 115 comprising an arcuate arm member. The power plate 115 is positioned to engage actuator pin 116 of microswitch 117 so as to maintain the switch 117 in the "on" position shown in FIG. 12 for instance, whenever the operator arm 16 is in a plane at or below the line L—L of FIG. 11.

When the arm 16 is urged upwardly as viewed in FIGS. 11 to 14, i.e. from the plane L—L, the switch 117 will be shifted to the open or "off" position.

The control mechanism includes a high speed switch 118, FIG. 10, in the path of movement of the lower end 132 of the drive lever 130. The switch 118 is of the double pole-double throw variety.

When the lever 130 is shifted a predetermined distance to one side of the dead center position shown in FIG. 10, it will be appreciated that contacts 119 will be closed, it being understood that when the lever is shifted to the opposite side of dead center contacts 120 will be closed.

The operating circuit is such that when the power switch 117 is closed and when either of contacts 119 or 120 are also closed, the tape drive motor M will be energized to the fast mode.

The positions of the various components will now be described in the forward mode, it being understood that since the gate and control mechanisms are symmetrical about a vertical axis, the positions of the parts when shifted to the reverse mode will be precisely opposite to those described. Accordingly, a description in the forward mode only will suffice.

The position of the parts is shown in the forward play position in FIG. 11. In such position the power switch 117 is held on by plate 115 and the tape track selector plate is in the forward track position. Now if the operator arm is moved to the fast forward position, e.g. shifted to the left as shown in FIG. 11, it will be perceived that the drive plate 125 will be carried to the left through the connection of neck 127 of operator arm 16 with detent notch 92 in the plate 125. Should it be desired to lock the device in the fast forward mode when the arm 16 is in alignment with the notch 96, the arm is manually biased upwardly so as to be disposed within the notch 96, whereupon the transverse spring biasing forces exerted by the drive lever 130 against plate 125 will induce a slight rightward movement, engaging the neck 127 of arm 16 under the toe 121 of the detent notch 96. The parts are now positioned as shown in FIG. 13.

In this position the switch contacts 120 are closed and the motor is in the fast mode. Should it be desired to shift from the fast forward mode to the off/eject mode corresponding to position A, FIGS. 1 and 15, the neck 127 of arm 16 is shifted downwardly and to the left along the dotted line path 122 appearing in FIG. 11, clearing the edge 126 of the plate 125 until the arm 16 is in alignment with notch 98 in the top wall 14. In this position, the arm 16 is pressed downwardly and released, to be retained under detent toe 123.

It will be observed that when detented within notch 98, the arm 16 is in the plane L'—L', whereby the power switch 117 remains in the "off" position.

It will further be observed that the tape track control pin 106 clears the end portion of the tape track control plate 99, whereby the plate and, hence, the sense of the switch 103 controlling the tape track is not changed.

Should the user now wish to shift the device into the forward play mode, the neck 127 of arm 16 is moved upwardly, clearing toe 123 from the plane L'—L' to the plane L—L and into notch 92 in the actuator plate 125. In such position play will be resumed on the forward track. Should the user desire to back space for a short distance so as to enable a previously played passage to be repeated, the arm 16 is shifted to the right without removing the arm from notch 92, i.e. to the review position. Such movement carries with it the plate 125, whereby contacts of the high speed switch 118 are energized until the arm 16 is released, whereupon plate 125 will return to the position of FIG. 11 under the influence of spring 133 and the recorder will continue to play in the forward mode.

Should the user now wish to shift the device to the center "off" position, the actuator arm 16 is lifted from the notch 92 downwardly so as to dispose the upper end of the arm 16 in the plane L'. Such movement results in the head control plate actuator pin 106 entering into aperture 112 of the tape track selector plate 99. Further movement rightwardly of the arm 16 will cause the plate 99 to be shifted partially to the right. In this mode, since the arm 16 and the power switch operator plate 115 are cleared from the actuator pin 116 of microswitch 117 and rest on dwell surface 90 of the plate 83, the power to the device will be shut off.

Should it now be desired to shift the device to the reverse play mode, the arm 16 is shifted further to the right and raised to the plane L so that neck 117 enters notch 91. The continued rightward movement of the arm 16 will carry the tape track selector plate 99 further to the right, reversing the position of switch 102 as a result of contact between the switch finger 101 and the control switch trip lever 103. When the arm 16 is in notch 91, the device will be in reverse play.

As previously noted, further rightward movement, either level with or into notch 95, will energize the fast switch due to the motion imparted to plate 125 and consequently arm 130 and switch 118. Since the plate 125, under the influence of spring 133, tends normally to assume a centered position, it will be perceived that while the arm 16 is in either of notches 91 or 92 and it is desired to back space, it is merely necessary to urge the arm 16 to the centered or review position, and when the necessary back spacing has been achieved, to release the arm, whereby the centering forces of the plate 125 acting on arm 16 will return the arm to the respective forward or reverse playing mode.

The slot 114 in the tape head change plate 99 is provided merely for purposes of clearance as respects the tape track control pin 106. More specifically, where the arm 16 is in a limiting position in detent 97 and is then returned to a position in notch 91, for example, it is not desired that the tape track change plate be moved, and the slot 116 provides a clearance area permitting lateral shifting of the pin 106 without concomitant movement of the plate 99.

Optionally, an additional "on-off" switch over-riding the power switch 117 may also be provided, which switch may be located within the case at an inaccessible position, enabling the device to be deactivated and reenergized solely by an attendant having access to the switch.

There will now be described, with particular reference to FIGS. 3 through 8, the various positions of the parts in the operative modes of the device.

Beginning with FIG. 5, the parts are disclosed in the forward play position. In such figure, the cassette CAS is mounted such that the capstans 20, 21 project through the appropriate openings of the cassette, the turntables 22, 23 are in driving engagement with the reels of the cassette, and the tape head 60 has entered into the appropriate notch of the cassette, whereby the tape head is pressed against the tape within the cassette which, as is known, is backed in the area of the head by a pressure pad forming a part of the cassette. In this position, the pressure roller 78 squeezes the tape against capstan 20 and the tape is caused to be advanced in a forward direction. Contact between pressure roll 77 and the tape is prevented by contact of arm 73 with blocking pin P of arm 51.

In such position the low level lift finger 86 of follower assembly 54 will have entered under cam portion 46, increasing the compressive forces exerted by leaf spring 42 urging pulley 31 toward turntable surface 39 and further compressing the felt washer or clutch 38. Such action couples forward take-up turntable 23 more tightly to its associated pulley 31 than is turntable 22 coupled to its respective pulley, whereby the tape is driven in the direction of the arrow a. By the action of capstan 20 and presure roller 78, a predetermined tension is maintained on the tape by the action of the supply and take-up reels.

It will further be appreciated that turntable 22 is counter-rotating and exerting an active drag force against the opposite reel of the cassette, whereby a tension is at all times maintained in the tape. This action is superior to a passive frictional force typically employed since active forces will remove or correct slack more quickly than a static drag.

The control arm 16 may be shifted to the position shown in FIG. 4, whereby the fast mode of the motor M will be energized in the manner previously described. The additional canting movement of the arm 16 results in the undersurface of branch arm 50 being shifted into abutting position against guide pin 58, whereby, with continued movement, the carrier plate member 48 is lifted bodily relative to the base plate 24 due to the connection provided by pivot pin 55 between the arm 16 and the carrier plate 48. Such lifting movement will be perceived to have raised the head 60 clear of the cassette.

The tilting movement noted functions, in addition, to shift the second follower finger 87 of follower portion 54 under the spring 40, whereby an even tighter coupling force is exerted on the clutch connected to turntable 22, enabling the greater forces of the rapidly rotating motor in the fast mode to be effectively transmitted to the take-up reel of the cassette.

It will be noted further that in the position of FIG. 4, pressure roll 78 has been lifted clear of connection with the tape by stop post 85.

In FIG. 3 the parts are displayed in the off/eject position. In such position the carrier plate 48 is raised to even a higher level. In such position the cassette may be removed by opening the hinged window and bodily drawing the cassette outwardly since no portion of the pressure rolls or tape head enters into the body of the cassette.

In FIG. 6 the parts are displayed in the play reverse position. It will be understood that FIG. 6 is an analog of FIG. 5 and, since the device is symmetrical about a vertical axis, need not be described in detail. It is sufficient to note that in such position pressure roll 77 presses the tape against capstan 21 and the clutch assembly connected with turntable 23 exerts a greater torque transmitting force than the clutch connecting turntable 23 to the drive assembly, whereby the tape reels will be driven by the capstan in the direction b, FIG. 6, and the reversely rotating turntable 22 will exert a drag force.

FIG. 7 shows the parts in the fast reverse position and is an analog of FIG. 4, and FIG. 8 shows the parts in the off reverse position, being an analog of FIG. 3.

From the foregoing it will be perceived that there is described in accordance with the present invention a tape transport mechanism operable through a multiplicity of modes by appropriate tilting and lateral movements of a single actuator arm.

A characterizing feature of the device resides in the fact that the tape is at all times subject to an active drag force opposing the direction in which the tape is moved, whereby a constant wind tension is achieved, reducing the possibility of tape spillage even if the device is misused by rapidly shifting between operating modes.

The device is simple and durable, rendering it particularly adapted for use as a leased instrument at museums, historical sites and like exhibits.

The respective tracks may be selectively played without the necessity for removing and reinserting the cassette and for the particular application mentioned above, the device may be sealed to prevent removal of the cassette since the cassette may be readily reset to a desired start position without opening the recorder.

The device is lightweight and is suitable for battery operation.

As will be apparent to those skilled in the art who have become conversant with the instant disclosure, numerous variations may be made in details of construction without departing from the spirit of the present invention. Accordingly, the same is to be broadly construed within the scope of the appended claims.

Having thus described the invention and illustrated its use, what is claimed as new and is desired to be secured by Letters Patent:

1. A bidirectional cassette tape player assembly comprising a base plate, a tape head carrier member mounted on said base plate for linear movement, a tape head member on said carrier member, a pair of spaced parallel capstans on said base plate, drive means operatively connected to said capstans for rotating the same in opposite directions about axes of rotation normal to the direction of linear movement of said carrier member, a pair of turntables rotatably mounted on said base plate in parallel spaced relation to said capstans, a pulley member coaxially aligned with each said turntable, a drive member coupling each said capstan with a pulley member, friction clutch means interposed between each said pulley and turntable and loosely frictionally coupling the same for conjoint rotation, a control lever mounted on said carrier member for rocking movement about an axis parallel to and positioned on a center line disposed between said capstans, said lever including spaced actuator arms, first and second cam members, each operatively associated with a respective said arm, each said cam member being disposed in proximate relation to one of said clutch means, each said arm member being effective to increase the frictional coupling forces of one of said turntable to one of said pulleys selectively responsive to rocking movements of said lever of a predetermined magnitude to opposite sides of said center line.

2. Apparatus in accordance with claim 1 and including main spring means biased against said carrier member and urging said carrier member toward a line extending between the axes of rotation of said turntables.

3. Apparatus in accordance with claim 2 and including a cassette hold-in lever mounted on said base plate, said main spring means including a first end portion mounted on said carrier member and a second end portion mounted on said hold-in lever.

4. Apparatus in accordance with claim 2 and including a pair of pressure roll members mounted on said carrier plate and means on said control lever for shifting one of said roll members into tape driving relation with one of said capstans selectively in accordance with the rocked position of said control lever.

5. Apparatus in accordance with claim 4 wherein said pressure roll members are mounted on levers pivotally connected to said carrier member, and pressure roll control spring means biased between said levers and carrier member and urging said member toward said capstans, the combination including a pressure roll lift pin on each said actuator arm, said lift pins being positioned to engage and pivot one of said pressure roll control levers to the capstan clearing position thereof selectively in accordance with the rocked position of said control lever.

6. Apparatus in accordance with claim 5 wherein said control lever includes a cross arm member extending between said actuator arms, and abutment means mounted on said base plate and disposed in the path of said cross arm member, said abutment means and cross arm member coacting to shift said lever and, hence, said carrier member bodily away from said line between said turntables responsive to rocking movements of said control lever and exceeding said predetermined magnitude.

7. Apparatus in accordance with claim 6 wherein said friction clutch means each includes a leaf spring member biased between said base plate and pulley and urging said pulley toward said turntable, and said cam means comprises an end portion of said leaf spring.

8. Apparatus in accordance with claim 7 wherein said actuator arms each include a follower portion positioned to engage said cam means and augment the biasing force of said leaf spring on said pulley responsive to said rocking movements of said predetermined magnitude.

9. Apparatus in accordance with claim 8 and including second follower portions on said actuator arms positioned to engage said cam means and further augment the biasing force of said leaf springs on said pulley responsive to rocking movements of said control lever greater than said predetermined magnitude.

10. Apparatus in accordance with claim 8 wherein said control lever includes an operating arm, the combination including gate means positioned to engage and retain said operating arm in at least two positions to opposites sides of said center line.

11. Apparatus in accordance with claim 10 wherein said tape head includes first and second track read-out portions, track selector switch means having at least two positions and operatively connected to said read-out portions for energizing a selected one of said read-out portions, and means operatively associating said selector switch means and said operating arm to shift said switch means between said two positions selectively in accordance with the position of said operating arm.

12. Apparatus in accordance with claim 9 and including fast wind switch means positioned to be activated responsive to said movements of said control lever greater than said predetermined magnitude.

* * * * *